June 4, 1963  E. E. MUEHLNER  3,092,821
LEAK METER FOR DETECTING FLUID PRESSURE LEAKS
Filed Sept. 6, 1960
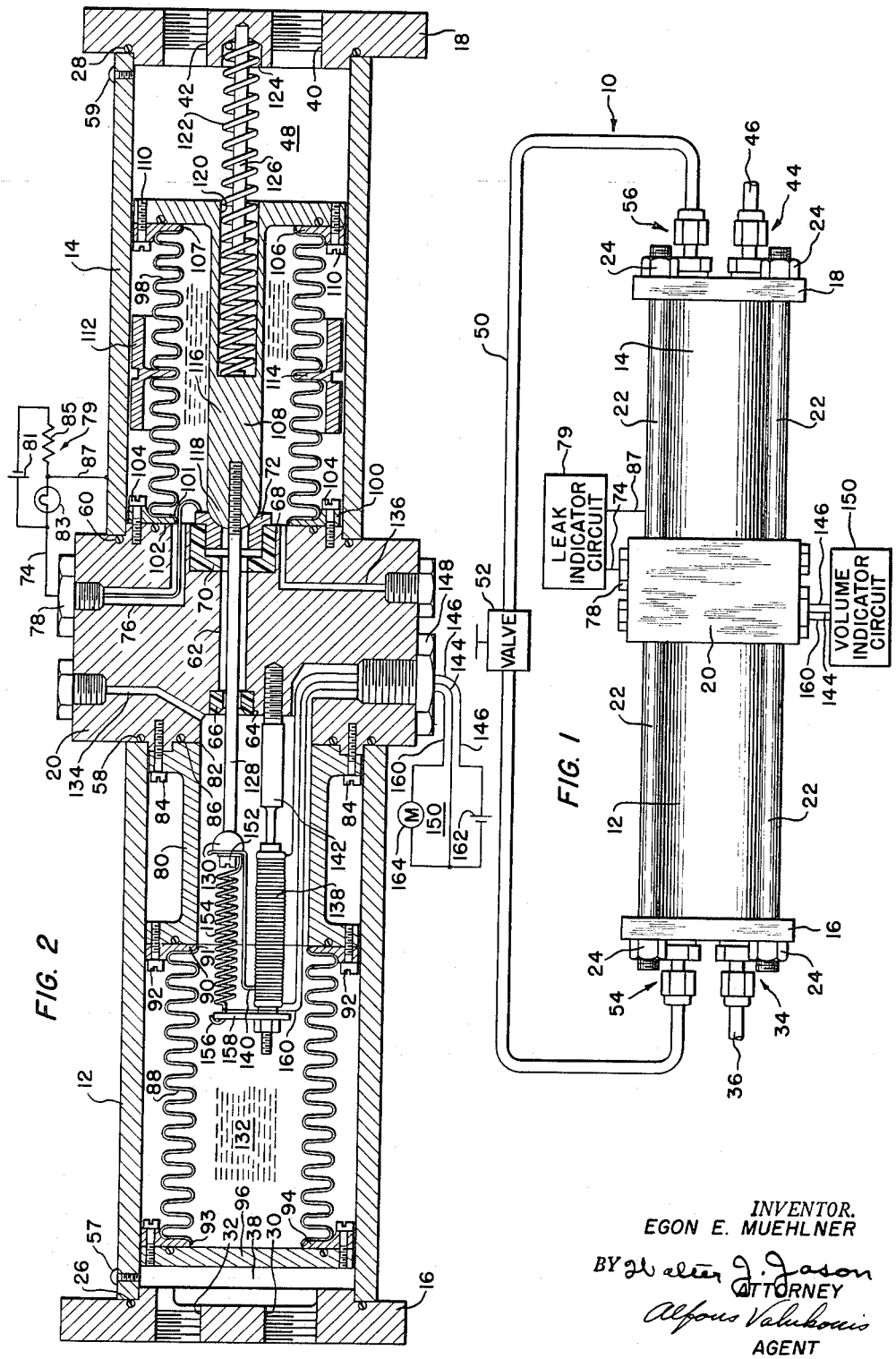
INVENTOR.
EGON E. MUEHLNER
BY Walter J. Jason
ATTORNEY
Alfons Valukonis
AGENT

United States Patent Office 3,092,821
Patented June 4, 1963

3,092,821
LEAK METER FOR DETECTING FLUID PRESSURE LEAKS
Egon E. Muehlner, San Diego, Calif., assignor to General Dynamics Corporation, San Diego, Calif., a corporation of Delaware
Filed Sept. 6, 1960, Ser. No. 54,282
2 Claims. (Cl. 340—238)

This invention relates generally to leak meters and more particularly to a leak meter for detecting the presence of fluid leaks in components subjected to fluid pressure.

In the apparatus of the type disclosed in copending application Serial No. 787,713, filed January 19, 1959, for "Leak Meter," it has been found that when extremely small leaks of fluid pressure are present in the component under test, the bellows fail to deform sufficiently to provide an indication of the presence of the leaks on the electrical indicating instrument. In the device of the present invention apparatus is provided which eliminates the disadvantage of the type of leak meter disclosed in the above application Serial No. 787,713, and instantaneously reveals the presence of a leak, no matter how small, in the component under test.

Accordingly, it is an object of the present invention to provide an improved leak meter of the type disclosed in application Serial No. 787,713.

It is another object to provide a pressure sensitive device which instantaneously detects the presence of a fluid leak in a component under test.

Still another object is to provide leak meter apparatus which instantaneously detects the presence of a fluid pressure leak in a component subjected to fluid pressure, and visually indicates the presence of such a leak.

Other objects of the invention will be apparent from the following description taken in connection with the accompanying drawings in which:

FIGURE 1 is an elevational view of the leak meter of the present invention and a showing of its electrical components in block diagram; and FIGURE 2 is partly a cross-sectional elevation of the leak meter of FIGURE 1 showing the details of the leak meter, and the electrical components in schematic diagram.

Referring to the drawings, the numeral 10 indicates generally the leak meter of the present invention which consists of a housing formed from cylindrical members 12 and 14, caps 16 and 18, and a center housing block or partition 20, all being held together by means of bolts 22 and nuts 24, as shown in FIGURE 1. The end caps 16 and 18 are generally rectangular in shape and are adapted to be fitted in sealing relationship with one end of the metallic cylindrical members 12 and 14, respectively, by the use of O-rings 26 and 28. The end cap 16 has a pair of threaded ports 30 and 32 therethrough. A fluid coupling 34 which is adapted to be inserted in the port 30 serves to connect one end of a conduit 36 to the chamber 38, the other end of the conduit being adapted to be connected to a source of fluid pressure, not shown. The end cap 18 has a pair of similarly threaded ports 40 and 42, the port 40 being adapted to receive a coupling 44 which connects one end of the conduit 46 to the chamber 48, the other end of the conduit 46 being adapted to be connected to a component or system under pressure, not shown, which is to be tested for the presence of fluid leakage. A bypass conduit 50 has a manually operable valve 52 therein, for a purpose to be hereinafter more fully explained. One end of the conduit 50 is connected to chamber 38 by means of a coupling 54 which is adapted to be inserted in the port 32, and the other end of the conduit 50 is connected to chamber 48 by means of a coupling 56 inserted in the port 42. A pair of plugs 57 and 59 are positioned in the walls of cylindrical members 12 and 14, respectively, for venting of chambers 38 and 48.

The center housing block, or partition 20, is generally rectangular in shape and is adapted to be positioned in sealing relationship with the other ends of cylindrical members 12 and 14 by means of O-rings 58 and 60. An orifice 62 is fashioned through the housing block for a purpose to be hereinafter more fully explained. A counterbore 64 at one end of the orifice 62 serves to position a ring-like member 66, preferably fashioned from an electrically insulative material such as Teflon or the like, which serves as a valve seat. The other end of bore 62 also has a counterbore 68 for the positioning of another ring-like member 70 which receives a valve seat 72. The member 70 is also fashioned from electrically insulative material such as Teflon. The valve seat 72 is metallic and has connected thereto an insulated wire lead 74 which passes through passage 76 in the center housing block 20 and out a suitable electrical feed-through member 78 to a leak indicator circuit 79.

The leak indicator circuit 79, best shown in FIGURE 2, consists of a voltage source 81, such as a battery, in series with a lamp indicator 83, and a resistor 85. The lead 74 is connected to the junction of the voltage source 81 and the lamp indicator 83, and a lead 87 connects the junction of the lamp indicator 83 and the resistor 85 to the metallic cylindrical member 14.

A support member 80, which is generally cylindrical in shape, is positioned in chamber 38 and secured at one end to a surface 82 of the center housing block 20 by means of suitable attaching means such as bolts 84. An O-ring 86 maintains the support member 80 in fluid tight relationship with the center housing block 20.

Secured to the other end of the support member 80 and within chamber 38 is a metallic bellows 88. The inner end of the bellows 88 is secured to a clamp ring 90, such as by sweating indicated at 91, the clamp ring 90 in turn being attached to a support member by bolts 92. The outer end of the bellows 88 is secured by sweating indicated at 93 to a clamp ring 94 which is secured to a head member 96.

A similar bellows 98 is positioned within chamber 48 and attached at its inner end to a clamp ring 100, as by sweating indicated by the numeral 101, the clamp ring 100 being secured to the surface 102 of the center housing block 20 by bolts 104. The other end of the bellows 98 is secured to the clamp ring 106 by sweating indicated at 107, the clamp ring 106 in turn being fastened to a valve member 108 by bolts 110. A bellows guide member 112, which is cylindrical in shape, is positioned in chamber 48 for sliding movement therein and in surrounding engagement with the belows 98 such that an inwardly projecting flange portion 114 is adapted to engage one of the folds of the bellows 98 to thereby serve to guide it in straight line motion when it contracts or expands.

The valve member 108 comprises an elongated portion 116 having a hemispherical end 118 adapted to seat on the valve seat 72. The elongated portion 116 is partially longitudinally bored at 120 to accommodate one end of a biasing spring 122 which serves to urge the bellows in a direction to seat the hemispherical end 118 on seat 72. The other end of the spring 122 is adapted to be inserted in a recess 124 in cap 18. The spring 122 surrounds a rod member 126 which is secured at one of its ends in the cap 18, as by a force fit, such that the other end protrudes into the bore 120 of the valve member 108 for maintaining the spring 122 in axial alignment with the bore.

A valve stem 128, which is positioned in the orifice 62 for longitudinal movement therein as the bellows 88 and 98 expand or contract, is threadedly attached at one end to the hemispherical end 118 of the valve member 108.

The other end of the valve stem 128 is provided with a hemispherically shaped valve 130 threadedly secured thereto, and which is fashioned from Teflon and adapted to seat in valve seat 66 when the bellows 88 is in its most contracted position and the bellows 98 is in its most expanded position. A liquid 132, preferably one having a low vapor pressure, fills the interiors of the bellows 88 and 98 and the support member 80 and is capable of flow from one bellows to the other through the orifice 62 when the bellows expand or contract, except when the valve end 118 is seated on the seat 72 or the valve 130 is seated on the valve seat 66. Passages 134 and 136 in the center housing block or partition 20 are provided whereby the liquid 132 can be supplied to the interior of the leak meter.

A potentiometer consisting of a resistor portion 138 and a movable portion 140 is positioned within the housing to provide an electrical signal proportional to the volume of fluid leaked from the component under test. The resistor portion 138 of the potentiometer is adapted to be mounted on an elongated member 142 and has a pair of insulated leads 144 and 146 which pass through an electrical feed-through member 148 and are connected to a volume indicator circuit 150, to be hereinafter more fully described. The movable arm 140 is secured to the valve 130 by bolt 152 for movement therewith along the resistor portion 138 and has electrical connection with a metallic spring 154 which has one end also secured to the valve 130 by the bolt 152. The other end of the spring 154 is formed in the shape of a hook 156 which is adapted to be secured to a support member 158 as by positioning through a suitably sized aperture therein. The support member 158 is formed from electrically insulative material, such as Teflon, and is carried by the elongated member 142. An insulated lead 160 is connected at one end to the hook 156 of spring 154 and passes through the electrical feed-through member 148 to the volume indicator circuit 150.

The volume indicator circuit 150, the details of which are best shown in FIGURE 2, consists of a voltage source 162, such as a battery, and a voltmeter 164, in circuit arrangement such that the leads 144 and 146 are connected across the negative and positive terminals of the voltage source 162, respectively, and the lead 160 is connected to one terminal of the voltmeter 164, the other terminal of the voltmeter being connected to the negative terminal of the voltage source 162.

The operation of the leak meter of the present invention is as follows: Initially, with the pipe 36 connected to the source of fluid pressure, not shown, the pipe 46 connected to the component under test, and the valve 52 in an opened-position, equal fluid pressures are exerted on the bellows 88 and 98, and they remain in a substantially undeformed state, as shown in FIGURE 2. Under these conditions, the springs 122 and 154 apply a force to the bellows 98 to urge the hemispherical valve portion 118 of the valve 108 in a direction to seat it in the valve seat 72. Thus situated, the valve portion 118 and the valve seat 72 constitute the movable and stationary elements of an electrical switch, respectively, the switch being in a closed-position, as shown. In this closed-position an electrical short of the lamp indicator 83 takes place such that the electrical energy produced by the voltage source 81 assumes a path through the lead 74, seat 72, valve portion 118, the metallic bellows and housing, lead 87, and resistor 85 back to the voltage source 81, thus by-passing the lamp indicator 83 to maintain it deactivated in response to the closed-position of the switch, and to indicate thereby the initial substantially undeformed state of the bellows.

On the other hand, when the valve 52 is closed and a leak is present in the component, an instantaneous increase in fluid pressure manifests itself between the chambers 38 and 48. This difference in pressure, regardless of how small, serves to contract the bellows 88 such that the valve portion 118 is unseated from the seat 72, thus eliminating the electrical short of the lamp indicator 83, hereinbefore described. The lamp indicator 83 now becomes energized by the flow of electrical energy through the series circuit path afforded by the energy source 81, the resistor 85, and the lamp indicator itself, in response to the open-position of the switch embodied in the valve portion 118 and seat 72 arrangement, to serve as an indicator of a deformed state of the bellows 88 and 98 and the presence of a leak in the component.

Also, when valve portion 118 is unseated from the seat 72 by contraction of the bellows 88 due to a difference in pressure between the chambers 38 and 48, the fluid 132 passes from the interior of the bellows 88, through the orifice 62 and finds accommodation within the interior of the bellows 98. The greater the pressure difference between the chambers 38 and 48, the greater the displacement of liquid 132 from the interior of bellows 88 to the interior of bellows 98. The volume of fluid 132 thus expelled from the interior of bellows 88 is proportional to the volume of fluid leaked from the component. As the bellows 88 and 98 deform, the volume of liquid 132 displaced, and correspondingly the volume of fluid leaked from the component, is reproduced in movement of the movable arm 140 of the potentiometer. As the movable arm 140 moves over the resistor portion 138, it picks off an increasing voltage whose instantaneous value, as indicated by the meter 164, is a measure of the volume of the fluid leaked from the component under test.

While a certain embodiment of the invention has been specifically disclosed, it is to be understood that the invention is not limited thereto, since many variations will be readily apparent to those skilled in the art and the invention is to be given its broadest possible interpretation within the terms of the appended claims.

I claim:

1. A differential pressure indicator comprising housing means, partition means having an orifice within said housing means for providing a pair of interconnected chambers, said chambers each being adapted to receive fluid pressure, an expansible chamber member in each of said chambers, said expansible chamber members each having an inner end secured to said partition means around said orifice and a movable end, each of said expansible chamber members being free to move independently of the other, a liquid within said expansible chamber members, valve means for closing said orifice to effect a normal substantially undeformed state of said expansible chamber members when one of said expansible chamber members is urged toward said partition means and for opening said orifice to effect a deformed state of said expansible chamber members when the fluid pressure in the chamber containing the other of said expansible chamber members exceeds the fluid pressure in the other chamber, said valve means comprising a metallic valve member carried by said one expansible chamber member for movement therewith and having an elongated portion therein, a ring-like member positioned within said orifice, said ring-like member being of electrical insulation material, and a metallic valve seat carried by said ring-like member and adapted to accommodate the end of said elongated portion to provide seating therefor, resilient means for urging said valve member toward said partition means to effect seating of said elongated portion, and electrical circuit means connected to said valve member and said valve seat for indicating said states.

2. A differential pressure indicator comprising housing means, partition means having an orifice within said housing means for providing a pair of interconnected chambers, said chambers each being adapted to receive fluid pressure, an expansible chamber member in each of said chambers, said expansible chamber members each having an inner end secured to said partition means around said orifice and a movable end, each of said expansible chamber members being free to move independently of the other, a liquid within said expansible chamber members, valve means for closing said orifice to effect a normal substantially undeformed state of said expansible chamber members when one of said expansible chamber members is urged toward said partition means and for opening said orifice to effect a deformed state of said expansible chamber members when the fluid pressure in the chamber containing the other of said expansible chamber members exceeds the fluid pressure in the other chamber, said valve means comprising a metallic valve member carried by said one expansible chamber member for movement therewith and having an elongated portion therein, said elongated portion having a partial longitudinal bore, a ring-like member positioned within said orifice, said ring-like member being of electrical insulation material, and a metallic valve seat carried by said ring-like member and adapted to accommodate the end of said elongated portion to provide seating therefor, a spring having one end positioned within said bore for urging said valve member toward said partition means to effect seating of said elongated portion, a rod member disposed within said spring and having one end secured to said housing means and the other end protruding within said bore in axial alignment with said bore and said spring, and electrical circuit means connected to said valve member and said valve seat for indicating said states.

References Cited in the file of this patent

UNITED STATES PATENTS

| | | |
|---|---|---|
| 2,373,041 | Martindell | Apr. 3, 1945 |
| 2,466,071 | Barnes et al. | Apr. 5, 1949 |
| 2,659,390 | MacLea et al. | Nov. 17, 1953 |
| 2,664,749 | Jones | Jan. 5, 1954 |
| 2,762,392 | Reese | Sept. 11, 1956 |
| 2,772,409 | Reid | Nov. 27, 1956 |
| 2,810,034 | Grant | Oct. 15, 1957 |
| 2,826,754 | Carignan | Mar. 11, 1958 |
| 2,879,892 | Frakes | Mar. 31, 1959 |
| 2,939,314 | Prince | June 7, 1960 |